United States Patent
Potter et al.

(10) Patent No.: US 10,107,404 B2
(45) Date of Patent: *Oct. 23, 2018

(54) LINEAR HYDRAULIC VALVE

(71) Applicant: Boston Dynamics, Inc., Waltham, MA (US)

(72) Inventors: Steve Potter, Bedford, MA (US); Haink Tu, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,680

(22) Filed: Aug. 24, 2017

(65) Prior Publication Data

US 2018/0003307 A1 Jan. 4, 2018

Related U.S. Application Data

(63) Continuation of application No. 15/288,230, filed on Oct. 7, 2016, now Pat. No. 9,777,849, which is a continuation of application No. 14/587,873, filed on Dec. 31, 2014, now Pat. No. 9,494,246.

(60) Provisional application No. 62/027,577, filed on Jul. 22, 2014.

(51) Int. Cl.
| | |
|---|---|
| *F16K 11/07* | (2006.01) |
| *F16K 37/00* | (2006.01) |
| *F16K 31/06* | (2006.01) |
| *F16K 31/04* | (2006.01) |

(52) U.S. Cl.
CPC .......... *F16K 11/0716* (2013.01); *F16K 31/04* (2013.01); *F16K 31/0613* (2013.01); *F16K 37/0041* (2013.01); *Y10T 137/86879* (2015.04)

(58) Field of Classification Search
CPC .. F16K 31/04; F16K 31/0613; F16K 11/0716; F16K 37/0041; Y10T 137/86815; Y10T 137/86831; Y10T 137/86879; Y10T 137/86509; Y10T 137/86517; Y10T 137/86549; Y10T 137/86775;
(Continued)

(56) References Cited

U.S. PATENT DOCUMENTS

| | | | |
|---|---|---|---|
| 3,678,959 A | 7/1972 | Liposky | |
| 4,099,673 A * | 7/1978 | Heath | ................... B05B 7/1209 239/415 |
| 4,457,341 A | 7/1984 | Aspinwall | |

(Continued)

*Primary Examiner* — Michael R Reid
(74) *Attorney, Agent, or Firm* — Honigman Miller Schwartz and Cohn LLP

(57) ABSTRACT

Examples are provided that describe a linear hydraulic valve. In one example a linear valve comprises a sleeve with a plurality of ports spaced apart from each other at a distance. The plurality of ports are associated with a plurality of pressurized fluids. A spool comprising a plurality of openings that correspond to the plurality of ports is provided within the sleeve. The plurality of openings are spaced apart in a manner that enables alignment of a given opening of the plurality of openings to a given port of the plurality of ports based on a given position of the spool within the sleeve. The linear valve comprises an actuator for moving the spool in a forward or reverse linear motion along a longitudinal axis of the sleeve. The spool may be moved to a given position based on selection of a pressurized fluid of the plurality of pressurized fluids.

20 Claims, 12 Drawing Sheets

(58) Field of Classification Search
CPC ..... Y10T 137/86799; Y10T 137/86807; Y10T 137/86501
USPC ............ 137/625.11, 625.35, 625.38, 625.39, 137/625.4, 625.42, 625.48, 625.12, 137/625.13, 625.17; 251/129.04
See application file for complete search history.

(56) References Cited

U.S. PATENT DOCUMENTS

| | | |
|---|---|---|
| 5,732,678 A | 3/1998 | Lindquist et al. |
| 6,382,587 B1 | 5/2002 | Rabe et al. |
| 6,427,970 B1 | 8/2002 | Silva |
| 7,681,593 B1 | 3/2010 | Horvat et al. |
| 8,001,993 B2 | 8/2011 | Cook |
| 8,128,056 B2 | 3/2012 | Jung |
| 8,297,589 B2 | 10/2012 | Dourdeville et al. |
| 9,494,246 B1 * | 11/2016 | Potter .................... F16K 31/04 |
| 9,777,849 B2 * | 10/2017 | Potter ................ F16K 11/0716 |

* cited by examiner

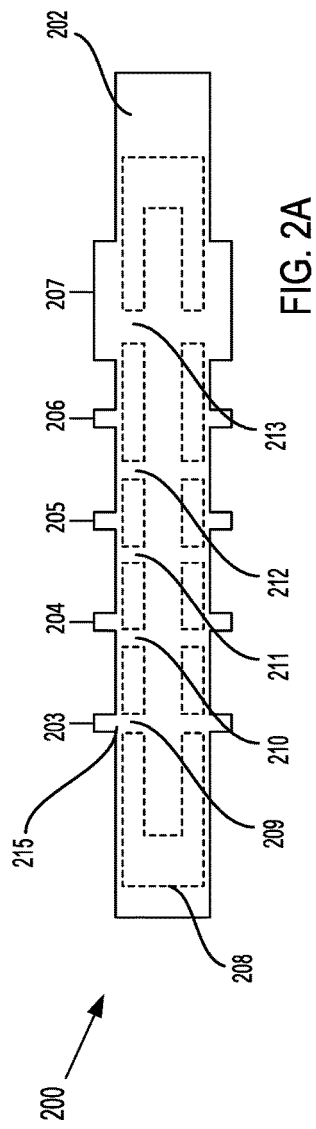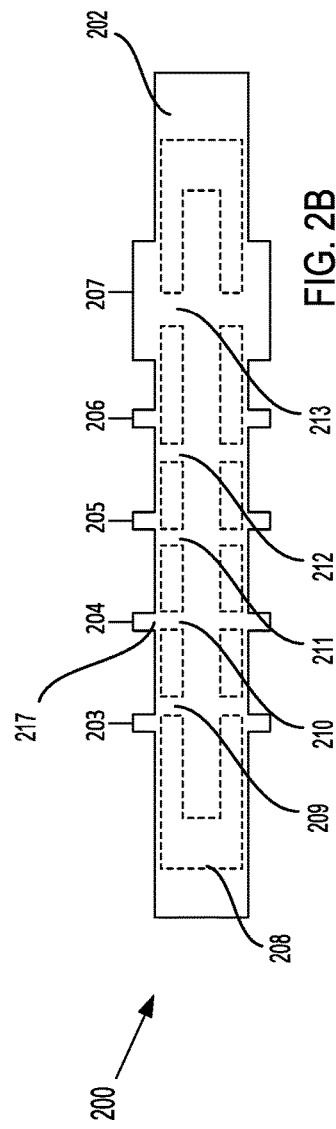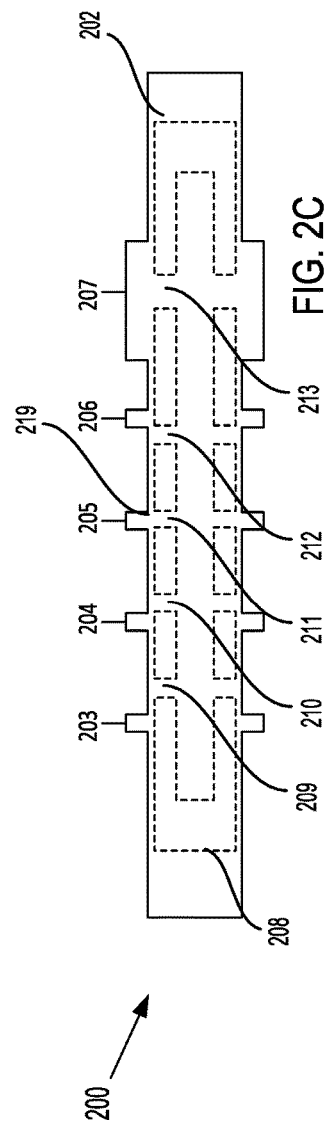

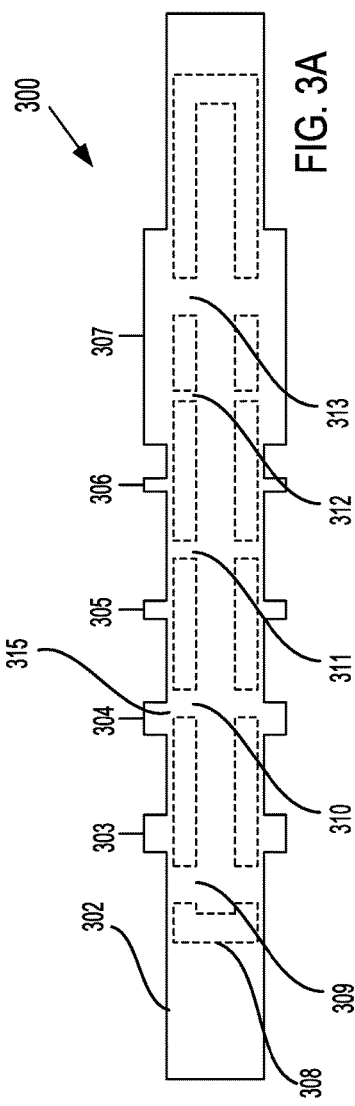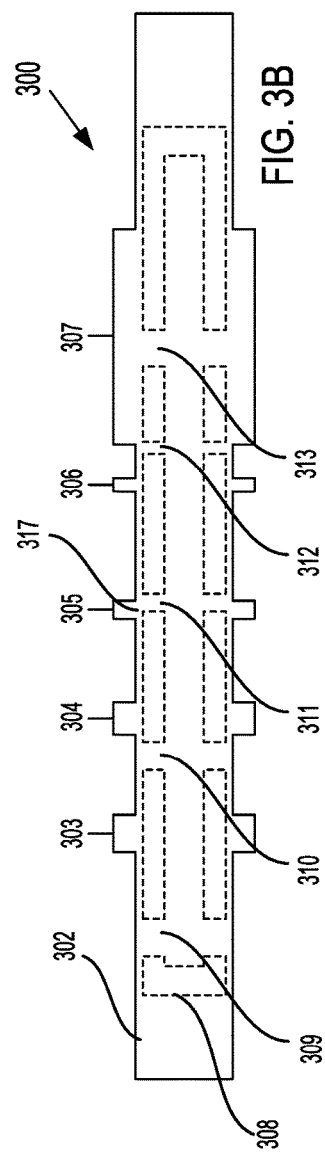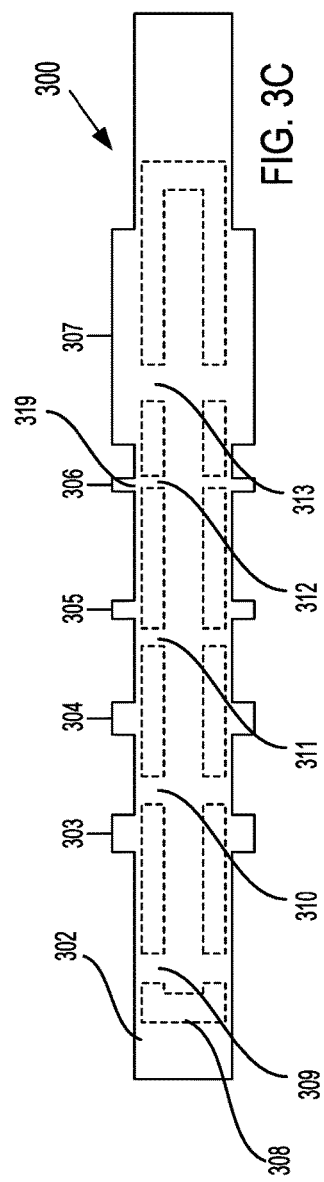

LINEAR HYDRAULIC VALVE

CROSS REFERENCE TO RELATED APPLICATION

This U.S. patent application is a continuation of, and claims priority under 35 U.S.C. § 120 from, U.S. patent application Ser. No. 15/288,230, filed on Oct. 7, 2016, which is a continuation of U.S. patent application Ser. No. 14/587,873 filed on Dec. 31, 2014, which claims priority under 35 U.S.C. § 119(e) to U.S. Provisional Patent Application 62/027,577, filed on Jul. 22, 2014. The disclosures of these prior applications are considered part of the disclosure of this application and are hereby incorporated by reference in their entireties.

GOVERNMENT LICENSE RIGHTS

This invention was made with government support under Contract No. W31P4Q-13-C-0107 awarded by the Defense Advanced Research Projects Agency. The government has certain rights in the invention.

TECHNICAL FIELD

This disclosure relates to linear hydraulic valves.

BACKGROUND

Unless otherwise indicated herein, the materials described in this section are not prior art to the claims in this application and are not admitted to be prior art by inclusion in this section.

One of the ways that hydraulic machines are capable of performing work is through use of pressurized fluids. Pressurized fluids may be transmitted throughout the machine to various hydraulic actuators. Hydraulic machinery has reached wide scale use due to the large power that can be transferred in the form of pressurized fluids and the large availability of actuators that can make use of the power.

Control is needed in order to operate hydraulic machinery in an effective manner. As an example, one way control is provided is through the use of valves. The ability to select between various pressurized fluids may be achieved through the use of a valve. This allows a passageway to be created that enables a pressurized fluid to flow from a source to an actuator that is responsible for moving a component of a hydraulic machine.

SUMMARY

In one example, a linear valve is provided comprising a sleeve. The sleeve comprises a plurality of ports along a longitudinal axis and spaced apart from each other at a distance. The plurality of ports are associated with a plurality of pressurized fluids. A spool is provided within the sleeve. The spool may be provided at a position of a plurality of positions within the sleeve. The spool comprises an internal chamber. The spool comprises a plurality of openings corresponding to the plurality of ports of the sleeve. The plurality of openings are spaced apart in a manner that enables alignment of a given opening of the plurality of openings to a given port of the plurality of ports based on a given position of the spool within the sleeve. Alignment of the given opening to the give port provides access to the internal chamber. The linear valve comprises an actuator for moving the spool in a forward or reverse linear motion along the longitudinal axis of the sleeve to positions of the plurality of positions within the sleeve. The given position is based on a selection of a pressurized fluid of the plurality of pressurized fluids that corresponds to the given port so as to align the given opening of the plurality of openings with the given port of the plurality of ports. The linear motion moves the spool within the sleeve to cause transition between alignment of openings and corresponding ports. An amount of movement maps to a given alignment.

In another example, a linear valve is provided comprising a sleeve. The sleeve comprises a plurality of ports. The plurality of ports are positioned along a longitudinal axis of the sleeve. The plurality of ports are spaced apart from each other at a first distance. A spool is provided within the sleeve. The spool comprises a plurality of openings that form a plurality of channels. The plurality of openings are positioned along a longitudinal axis of the spool. The plurality of openings are spaced apart from each other based on a second distance. The second distance is determined based on a fraction of the first distance. The linear valve comprises a sensor for determining a linear movement of the spool based on a selection of a given pressurized fluid associated with a given port of the plurality of ports of the sleeve. A motor is coupled to the spool and configured for moving the spool along the longitudinal axis of the sleeve. The motor is configured for moving the spool based on the linear movement to enable alignment between the given port of the plurality of ports and a given opening of the plurality of openings.

In another example, a linear valve is provided comprising a sleeve. The sleeve comprises a plurality of ports. The plurality of ports are positioned along a longitudinal axis of the sleeve. The plurality of ports are spaced apart from each other at a first distance. A spool is provided within the sleeve. The spool comprises a plurality of openings along an external surface of the spool. The spool comprises an internal chamber. The plurality of openings are spaced apart from each other at a second distance that is based on a fraction of the first distance. The plurality of openings serve as a plurality of passageways from the external surface of the spool to the internal chamber. The plurality of openings comprises a plurality of grooves. The linear valve comprises a linear variable differential transformer for measuring a linear movement of the spool based on a selection of a given pressurized fluid associated with a given port of the plurality of ports. The linear valve also comprises a coupler for connecting the spool and the linear variable differential transformer. A voice coil actuator is coupled to the sleeve and configured for moving the spool along the longitudinal axis of the sleeve based on the linear movement.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 2A-2C illustrate three different positions pertaining to an operation of an example linear valve.
FIGS. 3A-3C illustrate three different positions pertaining to an operation of another example linear valve.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a hydraulic machine, including a linear valve, to enable selection of a pressurized fluid. The linear valve may include a sleeve comprising a plurality of ports spaced apart from each other at a distance. By way of example, the plurality of ports may be spaced along the long axis of the sleeve. The plurality of ports may be associated with a plurality of pressurized fluids. In one example, the plurality of ports may be associated with four pressurized fluids that correspond to four different levels of pressure. The linear valve may also include a spool that is provided within the sleeve. The spool may be positioned at a position of a plurality of positions within the sleeve. The spool may comprise a plurality of openings that are spaced apart in a manner that enables alignment of a given opening of the plurality of openings to a given port of the plurality of ports based on a given position of the spool within the sleeve. The linear valve may also include an actuator for moving the spool in a forward or reverse linear motion along a longitudinal axis of the sleeve to positions of the plurality of positions within the sleeve. The given position may be based on a selection of a pressurized fluid of the plurality of pressurized fluids that corresponds to the given port so as to align the given opening of the plurality of openings with the given port of the plurality of ports. The linear motion may be provided to move the spool within the sleeve to cause transition between alignment of openings and corresponding ports, wherein an amount of movement maps to a given alignment.

Figure 1A:
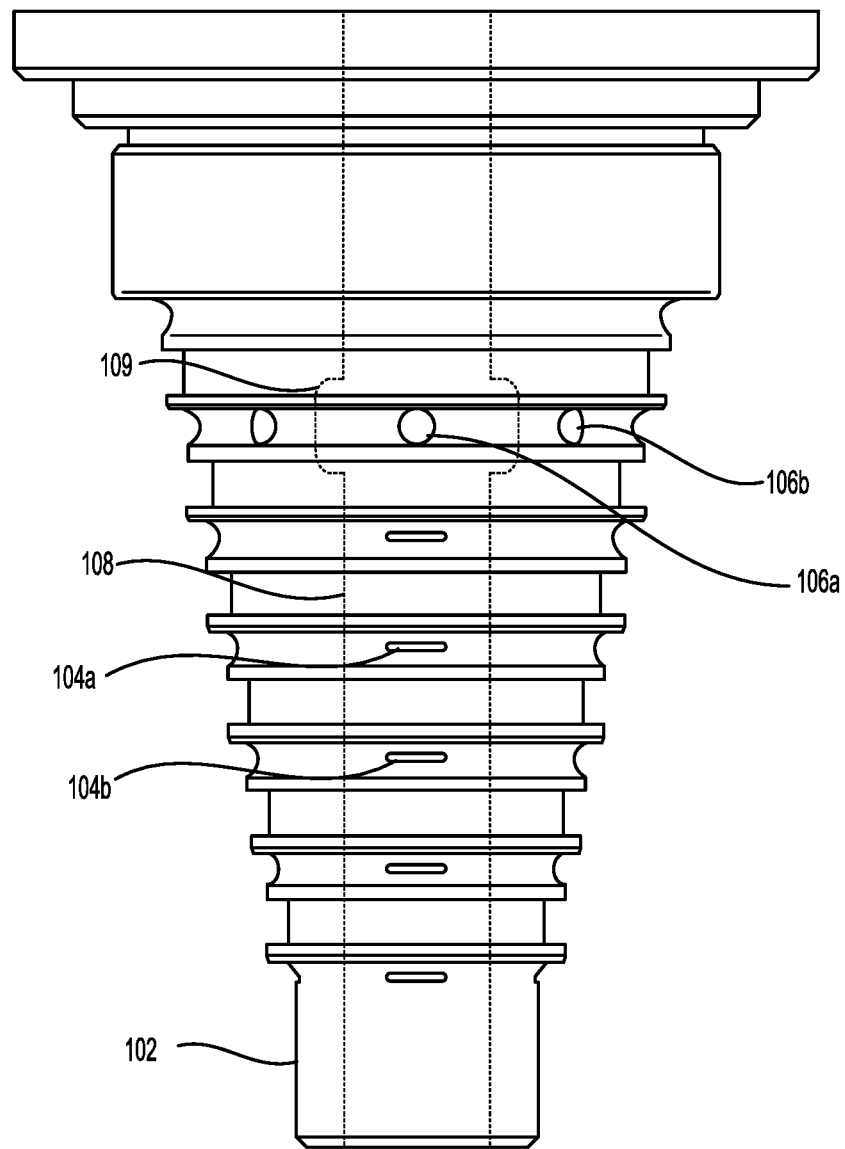
FIG. 1A illustrates a side view of an example sleeve.

Referring now to the figures, FIG. 1A illustrates a side view of a sleeve 102. The sleeve 102 comprises a plurality of ports 104a and 104b, a plurality of control port holes 106a and 106b, an internal cylindrical passage 108, and an undercut 109.

In one example, the sleeve 102 may comprise any number of materials such as aluminum, steel, and stainless steel. In one example, the sleeve 102 may comprise a total height of about 60 mm with an outside diameter of about 36 mm. By way of example, the sleeve 102 may comprise an internal diameter of about 9 mm for receiving an example spool with a diameter of about 9 mm. Maintaining a minimal amount of separation between the sleeve 102 and the example spool may help to reduce leakage associated with the plurality of pressurized fluids.

The plurality of ports 104a and 104b are spaced apart from each other at a distance. In one example, the distance associated with the spacing of the plurality of ports 104a and 104b is about 5.75 mm. The plurality of ports 104a and 104b may have an axial width of about 3 mm and an axial height of about 0.45 mm. The plurality of ports 104a and 104b are associated with a plurality of pressurized fluids. In one example, the plurality of ports 104a and 104b may comprise five ports, and the pressure levels associated with the five ports may comprise pressurized fluids at 3000 psi, 2250 psi, 1500 psi, 750 psi, and 100 psi. In this example, a hydraulic machine may be configured to operate in a dynamic environment that requires the use of various pressure levels associated with the plurality of pressurized fluids.

As shown in FIG. 1A, the plurality of control port holes 106a and 106b are positioned about an external surface of the sleeve 102. The plurality of control port holes 106a and 106b may be configured to receive a pressurized fluid with a pressure level that corresponds to a selection of a pressurized fluid corresponding to a given port of the plurality of ports 104a and 104b. By way of example, the plurality of control port holes 106a and 106b may be configured to receive or discharge a pressurized fluid to or from a given port of the plurality of ports 104a and 104b.

Depending on the pressurized fluid selected with the given port of the plurality of ports 104a and 104b, a given flow force associated with the pressurized fluid may cause an unintended movement of an example spool within the sleeve 102. Within examples, the plurality of ports may be spaced symmetrically about a circumference of the sleeve to mitigate any undesirable pressure or flow induced radial forces. In one example, the plurality of control port holes 106a and 106b may comprise a diameter of about 1.8 mm.

In another example, the sleeve 102 may comprise an internal cylindrical passage 108 comprising a diameter of about 9 mm. The internal cylindrical passage 108 may be configured to receive a sliding member. By way of example, the internal cylindrical passage 108 may be coated with a material such as diamond-like carbon to reduce friction and wear between the sliding member and the internal cylindrical passage 108.

Referring to FIG. 1A, the sleeve 102 may comprise an undercut 109. The undercut 109 may be an annular undercut within the sleeve 102 that provides access to the plurality of control port holes 106a and 106b. By way of example, the undercut 109 may provide access to a plurality of control openings of a spool (not shown) as well.

Figure 1B:
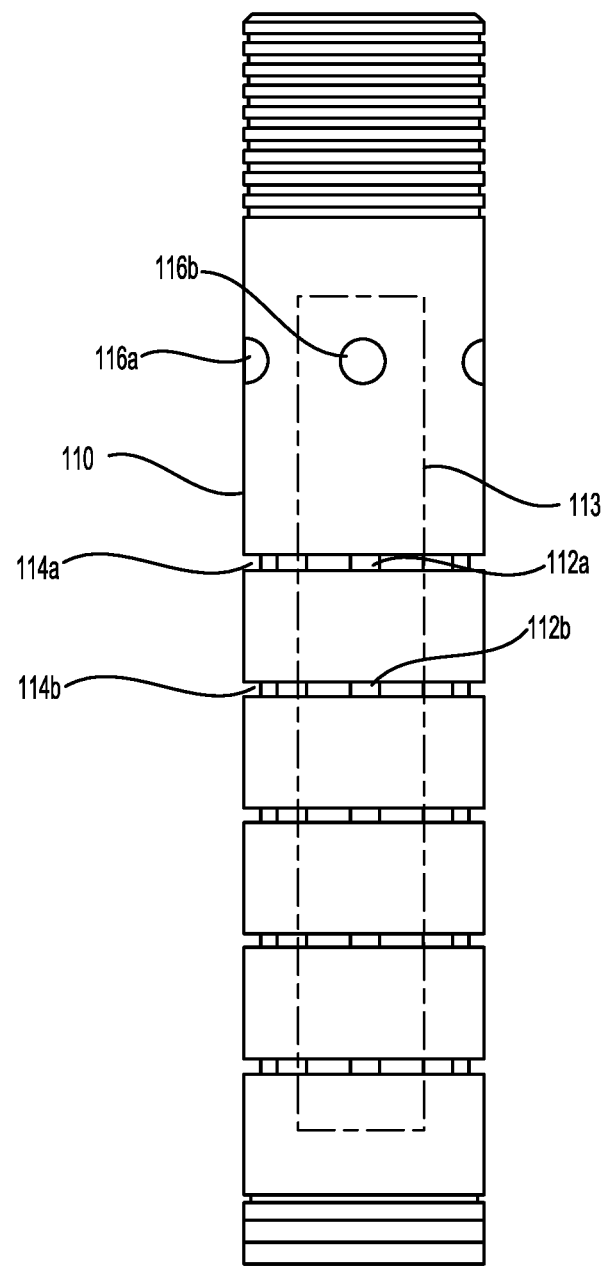
FIG. 1B illustrates a side view of an example spool.

FIG. 1B illustrates a side view of a spool 110. The spool 110 comprises a plurality of openings 112a and 112b. The spool 110 comprises a plurality of grooves 114a and 114b within the plurality of openings 112a and 112b. The spool 110 also comprises a plurality of control openings 116a and 116b along an external surface of the spool 110. The plurality of control openings 116a and 116b are configured to communicate with an internal chamber 113 of the spool 110.

In one example, the spool 110 may be provided within the sleeve 102. The spool 110 may be configured to move in a linear motion within the internal cylindrical passage 108 in order to provide the spool 110 at a position of a plurality of positions within the sleeve 102. In another example, the spool 110 may comprise a length of about 47.5 mm and a diameter of 9 mm. The spool 110 may comprise any number of materials such as aluminum, steel, and stainless steel.

The plurality of openings 112a and 112b may be spaced apart from each other at substantially an equal distance. In one example, the plurality of grooves 114a and 114b may comprise a width of about 0.5 mm and be separated at a distance of about 4.75 mm. In another example, depending on the position of the plurality of positions of the spool 110 within the sleeve 102, a given groove of the plurality of grooves 114a and 114b may be configured to align with a given port of the plurality of ports 104a and 104b. An alignment between the given groove and the given port would allow the pressurized fluid to flow to and from the sleeve 102 to the spool 110.

As shown in FIG. 1B, the spool 110 may comprise the internal chamber 113. The internal chamber 113 may be configured to receive a plurality of pressurized fluids. By way of example, the internal chamber 113 may be accessed through the plurality of grooves 114a and 114b.

The plurality of grooves 114a and 114b of the spool 110 may correspond to the plurality of ports 104a and 104b of the sleeve 102. The plurality of openings 112a and 112b may be spaced apart in a manner that enables alignment of a given opening of the plurality of openings 112a and 112b to a given port of the plurality of ports 104a and 104b based on a given position of the spool 110 within the sleeve 102. The plurality of openings 112a and 112b are configured as through-holes which break through to the internal chamber 113, thus connecting to the plurality of control openings 116a and 116b in the spool 110. In one example, the plurality of openings 112a and 112b may be pressure-balanced. For example, in order to be pressure-balanced the plurality of openings 112a and 112b at a given position may include a circular array of two holes that are spaced 180° apart. In another example, the plurality of openings 112a and 112b at a given position may include a circular array of three holes that are spaced 120° apart. In one example, based on the given position of the spool 110 within the sleeve 102, the given position may allow the pressurized fluid associated with the given port to flow from the sleeve 102 through the plurality of openings 112a and 112b into the internal chamber 113 and out of the plurality of control openings 116a and 116b.

As shown in FIG. 1B, the spool 110 may comprise a plurality of control openings 116a and 116b configured as through-holes connecting to the internal chamber 113 in order to enable a flow of the plurality of pressurized fluids. In one example, the plurality of control openings 116a and 116b may be spaced symmetrically about a circumference of the spool 110 to mitigate any undesirable pressure or flow induced radial forces.

Figure 1C:
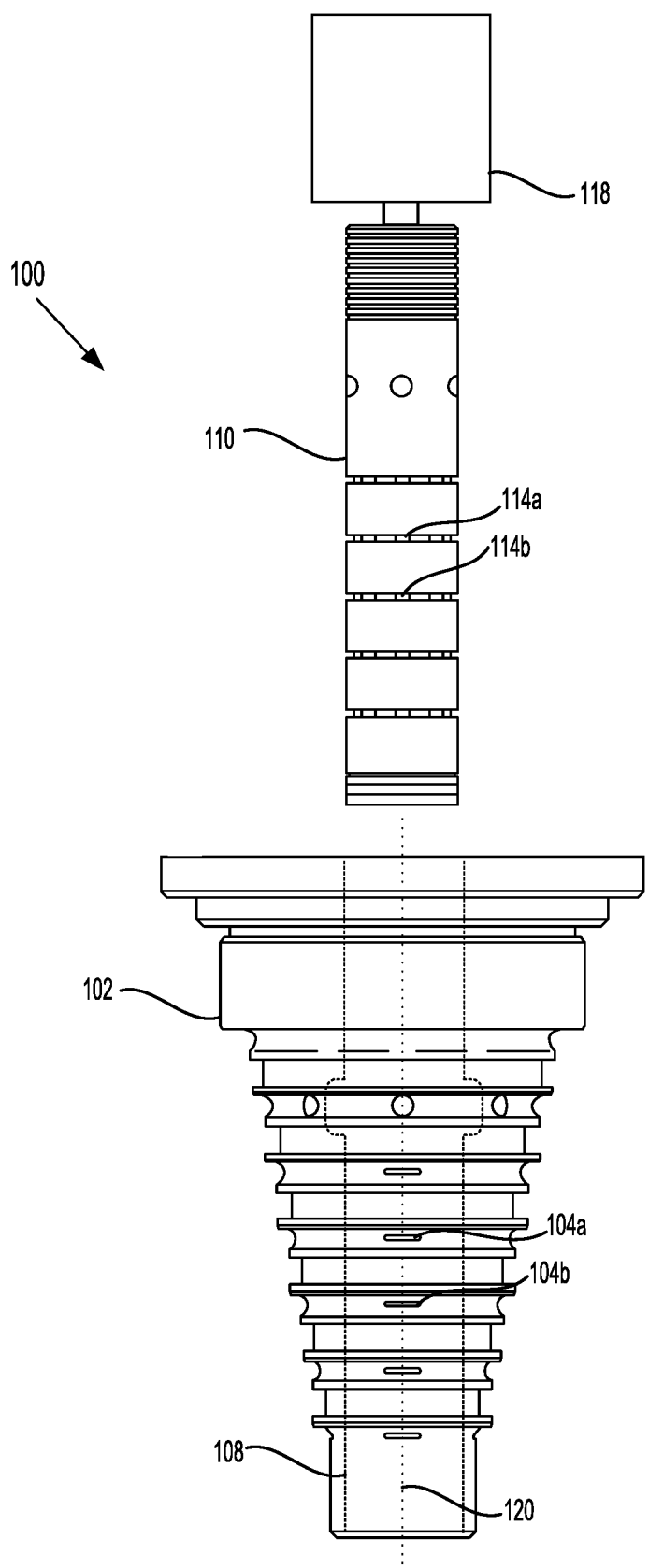
FIG. 1C illustrates an exploded view of subcomponents of an example linear valve.

FIG. 1C illustrates an exploded view of subcomponents of an example linear valve 100. The linear valve 100 comprises an actuator 118 coupled to the spool 110. The sleeve 102 is configured to receive the spool 110.

The actuator 118 may be configured for moving the spool 110 in a forward or reverse linear motion along a longitudinal axis 120 of the sleeve 102 to positions of the plurality of positions within the sleeve 102. The given position of the plurality of positions is based on a selection of a pressurized fluid of the plurality of pressurized fluids. The selection of the pressurized fluid of the plurality of pressurized fluids corresponds to the given port so as to align the given opening of the plurality openings 114a and 114b with the given port of the plurality of ports 104a and 104b. The linear motion is determined for moving the spool 110 within the sleeve 102 to cause a transition between alignment of openings 114a and 114b and corresponding ports 104a and 104b. In one example, an amount of movement of linear motion maps to a given alignment.

In another example, the actuator 118 may comprise a voice coil actuator. By way of example, the voice coil actuator may comprise a coil assembly and a stator assembly. The coil assembly may include a bobbin and the coil. The stator assembly may include an outer shell and an inner shell as well as permanent magnet material which may produce a radial magnetic flux in the annular gap between the two shells. The coil assembly may be inserted into an annular gap, and current may be supplied to the coil to produce a force tending to push or pull the bobbin into or out of the stator assembly. Various types of actuators may be implemented to provide the forward or reverse linear motion such as a DC brush motor, DC brushless motor, or a stepper motor just to name a few.

The forward or reverse linear motion enables the spool 110 to move in either direction, and to couple to a given first port at a first instance, and then to move in either direction so as to couple to a given second port using a predetermined amount of movement. The predetermined amount of movement may refer to an amount of movement of the spool 110 in either direction to cause alignment to a subsequent port based on a difference in distance between the spacing of two neighboring ports of the plurality of ports and the spacing of two neighboring openings of the plurality of openings. Using this example configuration, depending on a level or a pressurized fluid coupled to a given port of the sleeve 102, the valve can enable transitioning from a high pressure to a low pressure in a short amount of time. In an example where the valve controls fluid for operating actuators or a moving robotic device, the valve may provide a high pressurized fluid for fast walking, and quickly switch to a low pressurized fluid using the forward or reverse linear motion (e.g., when a high and low pressurized fluid are mapped to first and second ports of the sleeve) to transition to a port associated with the low pressurized fluid to cause the device to slow down quickly.

The spool 110 is provided within the sleeve 102 in order to enable alignment between the given opening of the spool 110 and the given port of the sleeve 102. An optimal distance associated with a movement of travel of the spool 110 within the sleeve 102 may be determined in order to enable a fast transition between alignment of the plurality of openings and the plurality of ports. A faster speed corresponding to changing an alignment of the plurality of openings 114 and the plurality of ports 104a and 104b may permit a hydraulic machine associated with the linear valve 100 to operate in an environment that requires a fast transition between the plurality of forces associated with the plurality of pressurized fluids.

The sleeve 102 is configured to receive the spool 110 in order to enable selection of a given pressurized fluid of the plurality of pressurized fluids. By way of example, the sleeve 102 may comprise a radial clearance of about 2 to 4.5 microns between the cylindrical passage 108 and the spool 110. The radial clearance of about 2 to 4.5 microns would allow the spool 110 to operate based on any radial expansion or contraction associated with the pressure level of the given pressurized fluid while exhibiting reasonable levels of leakage and viscous friction while using typical hydraulic fluids at typical temperatures.

Figure 1D:
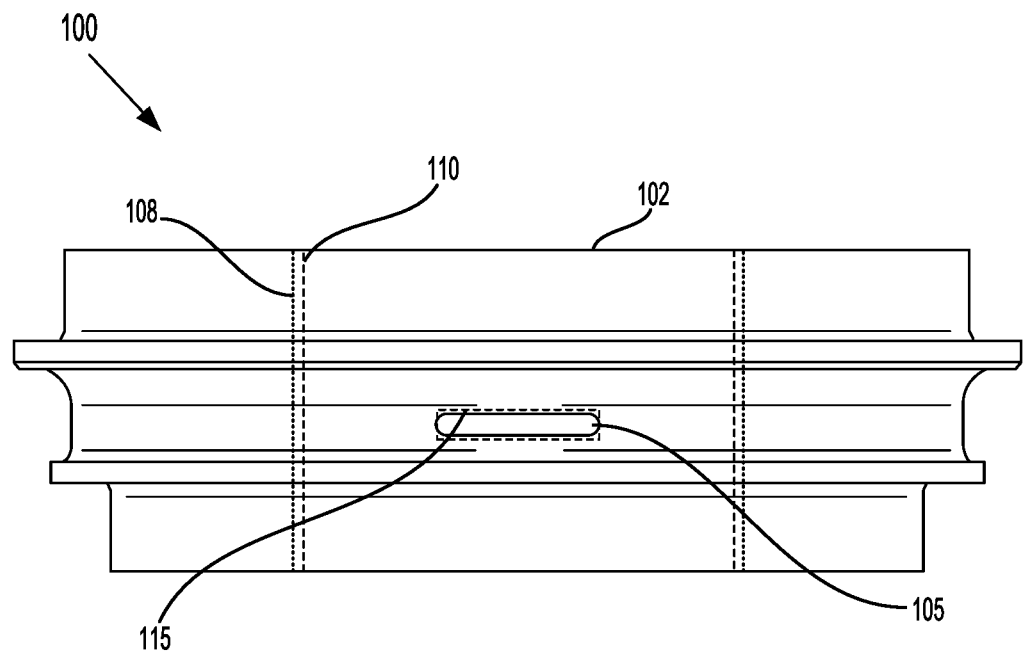
FIGS. 1D and 1E illustrate side views of another example linear valve.
Figure 1E:
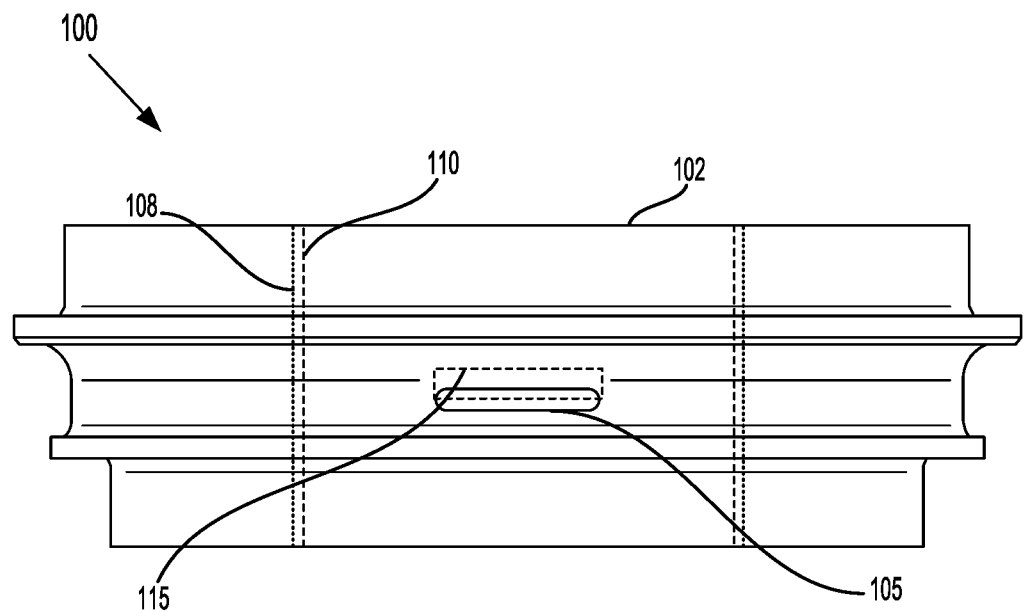

FIGS. 1D and 1E illustrate side views of a portion of the linear valve 100. The spool 110 is provided within the cylindrical passage 108 of the sleeve 102. An example alignment between a given opening 115 of the plurality of openings 114a and 114b and a given port 105 of the plurality of ports 104a and 104b is shown in FIGS. 1D and 1E.

Referring to FIG. 1D, the spool 110 is provided at a given position within the cylindrical passage 108 in order to cause alignment between the given opening 115 of the plurality of openings 114a and 114b and a given port 105 of the plurality of ports 104a and 104b, and thereby allow a pressurized fluid to flow from the sleeve 102 and through the spool 110. In one example, the actuator 118 may be configured to move the spool 110 to the given position so that the given opening 115 of the plurality of openings 114a and 114b overlaps the given port 105 of the plurality of ports 104a and 104b in order to enable substantially full alignment between the given opening 115 and the given port 105. Enabling substantially full alignment allows the pressurized fluid to flow at a maximum flow rate associated with the given port 105.

Referring to FIG. 1E, the spool 110 is provided at a given position within the cylindrical passage 108 in order to cause alignment between the given opening 115 of the plurality of openings 114a and 114b and a given port 105 of the plurality of ports 104a and 104b, and thereby allow a pressurized fluid to flow from the sleeve 102 and through the spool 110. In one example, the actuator 118 may be configured to move the spool 110 to the given position so that the given opening 115 of the plurality of openings 114a and 114b partially overlaps the given port 105 of the plurality of ports 104a and 104b for metering of the pressurized fluid. Metering the pressurized fluid may allow for a smooth change in pressure levels associated with a subcomponent of an example hydraulic machine. Metering of the pressurized fluid may be used for smoothly reducing flow or pressure to an actuator to control the actuator's force or velocity.

FIGS. 2A-2C illustrate three different positions of a spool within a sleeve pertaining to an example operation of a linear valve 200. A sleeve 202 comprising a plurality of ports 203, 204, 205, and 206 is shown in FIG. 2A. The sleeve 202 also comprises a control port 207. A spool 208 comprising a plurality of openings 209, 210, 211, and 212 is included in the sleeve 202. The sleeve 202 also comprises a control opening 213.

Referring to FIG. 2A, the spool 208 is positioned at a first position 215 within the sleeve 202 causing a given port 203 to substantially align to a given opening 209. As shown in FIG. 2A, ports 204, 205, and 206 are not aligned to openings 210, 211, and 212 while alignment occurs between the given port 203 and the given opening 209. Alignment between the given port 203 and the given opening 209 prevents the plurality of pressurized fluids associated with ports 204, 205, and 206 from being selected while the spool 208 is positioned at the first position 215.

Referring to FIG. 2B, the spool 208 is positioned at a second position 217 within the sleeve 202 causing a given port 204 to substantially align to a given opening 210. As shown in FIG. 2B, ports 203, 205, and 206 are not aligned to openings 209, 211, and 212 while alignment occurs between the given port 204 and the given opening 210. Alignment between the given port 204 and the given opening 210 prevents the plurality of pressurized fluids associated with ports 203, 205, and 206 from being selected while the spool 208 is positioned at the second position 217.

Referring to FIG. 2C, the spool 208 is positioned at a third position 219 within the sleeve 202 causing a given port 205 to substantially align to a given opening 211. As is shown in FIG. 2B, ports 203, 204, and 206 are not aligned to openings 209, 210, and 212 while alignment occurs between the given port 205 and the given opening 211. Alignment between the given port 205 and the given opening 211 prevents the plurality of pressurized fluids associated with ports 203, 204, and 206 from being selected while the spool 208 is positioned at the third position 219.

In one example, the plurality of ports 203, 204, 205, and 206 have axial widths of substantially equal lengths as shown in FIGS. 2A-2C. In another example, the plurality of openings 209, 210, 211, and 212 have widths of substantially the same lengths as the axial widths of the plurality of ports 203, 204, 205, and 206.

FIGS. 3A-3C illustrate three different positions of a spool within a sleeve pertaining to an operation of a linear valve 300. A sleeve 302 comprising a plurality of ports 303, 304, 305, and 306 is shown in FIG. 3A. The sleeve 302 also comprises a control port 307. A spool 308 comprising a plurality of openings 309, 310, 311, and 312 is shown in FIG. 3A. The sleeve 302 also comprises a control opening 313.

Referring to FIG. 3A, the spool 308 is positioned at a first position 315 within the sleeve 302 causing a given port 304 to partially overlap a given opening 310. As is shown in FIG. 3A, ports 303, 305, and 306 are not aligned to openings 309, 311, and 312 while alignment occurs between the given port 304 and the given opening 310. Alignment between the given port 304 and the given opening 310 prevents the plurality of pressurized fluids associated with ports 303, 305, and 306 from being selected while the spool 308 is positioned at the first position 315. Since the given port 304 partially overlaps the given opening 310, only a metered amount of the pressurized fluid associated with the given port 304 will flow. Metering the pressurized fluid provides an additional level of control over a flow rate associated with the pressurized fluid.

Referring to FIG. 3B, the spool 308 is positioned at a second position 317 within the sleeve 302 causing a given port 305 to partially overlap a given opening 311. As is shown in FIG. 3B, ports 303, 304, and 306 are not aligned to openings 309, 310, and 312 while alignment occurs between the given port 305 and the given opening 311. Alignment between the given port 305 and the given opening 311 prevents the plurality of pressurized fluids associated with ports 303, 304, and 306 from being selected while the spool 308 is positioned at the second position 317.

Referring to FIG. 3C, the spool 308 is positioned at a third position 319 within the sleeve 302 causing a given port 306 to partially overlap a given opening 312. As is shown in FIG. 3B, ports 303, 304, and 305 are not aligned to openings 309, 310, and 311 while alignment occurs between the given port 306 and the given opening 312. Alignment between the given port 306 and the given opening 312 prevents the plurality of pressurized fluids associated with ports 303, 304, and 305 from being selected while the spool 308 is positioned at the third position 319.

In one example, the plurality of ports 303, 304, 305, and 306 have axial widths of unequal lengths as shown in FIGS. 3A-3C. In another example, the plurality of openings 309, 310, 311, and 312 have widths of unequal lengths that correspond to the axial widths of the plurality of ports 303, 304, 305, and 306 as shown in FIGS. 3A-3C.

Figure 4A:
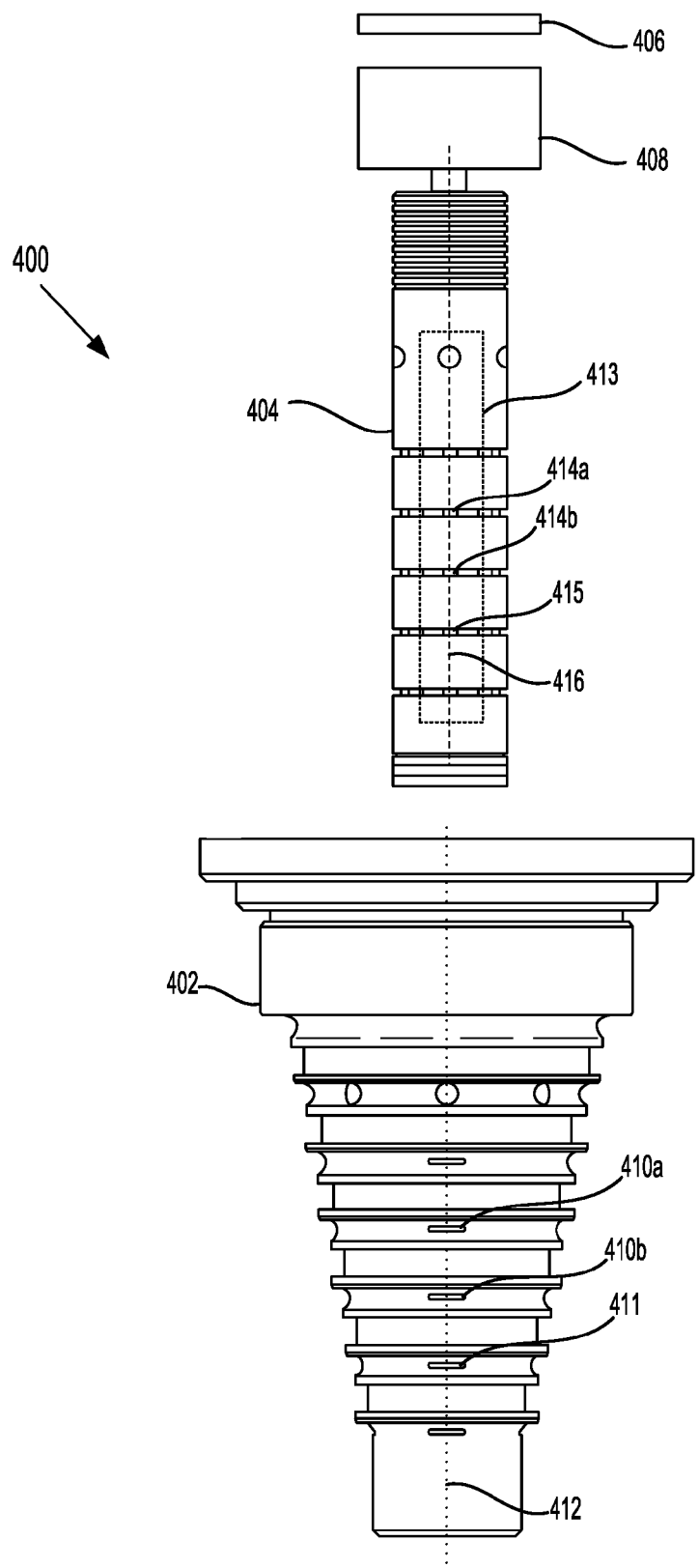
FIG. 4A illustrates an exploded view of subcomponents of another example linear valve.

FIG. 4A illustrates an exploded view of subcomponents of another example linear valve 400. Referring to FIG. 4A, linear valve 400 comprises a sleeve 402. A spool 404 is provided within the sleeve 402. A controller 406 may be coupled to the sleeve 402. A linear motor 408 coupled to the spool 404 is shown in FIG. 4A.

The sleeve 402 comprises a plurality of ports 410a and 410b. The plurality of ports 410a and 410b are positioned along a longitudinal axis 412 of the sleeve 402. The plurality of ports 410 are spaced apart from each other at a first distance.

The spool 404 comprises a plurality of openings 414a and 414b. The plurality of openings 414a and 414b may be machined through the spool 404 in order to form a plurality of channels. The plurality of openings 414a and 414b may each comprise grooves, slots or holes connecting through the wall of spool 404 to an internal chamber 413. The plurality of openings 414a and 414b are positioned along a longitudinal axis 416 of the spool 404. In one example, the plurality of openings 414a and 414b are spaced apart from each other based on a second distance. The second distance may be determined based on a fraction of the first distance.

In one example, the fraction may be less than one. By way of example, the second distance and the first distance may differ by a given fraction such that only a given port and corresponding given opening are aligned at a given position. In this example, the alignment may occur in sequence as the spool 404 traverses its travel.

In another example, the fraction may be greater than one. In this example, the larger of either the first distance or the second distance may be associated with either the plurality of openings 414a and 414b or the plurality of ports 410a and 410b. By way of example, the second distance could be sixth-fifths of the first distance and enable proper operation of the linear valve 400.

The relationship between the first distance and the second distance enables the spool 404 to be positioned within the sleeve 402 based on a predetermined distance. The relationship of the first distance to the second distance enables a given port to correspond to a given opening as the spool 404 is positioned within the sleeve 402. In one example, a predetermined linear movement is used to move the spool 404 within the sleeve 402 to provide alignment between the plurality of openings 414a and 414b and the plurality of ports 410a and 410b. By way of example, the predetermined linear movement may be configured to cause alignment between a given opening 415 and a given port 411 in a similar manner to a movement between a Vernier scale and a fixed main scale.

The linear motor 408 may be configured for moving the spool 404 along the longitudinal axis 412 of the sleeve 402 based on the linear movement to enable alignment between the given port of the plurality of ports 410a and 410b and a given opening of the plurality of openings 414a and 414b. In one example, the motor 408 may comprise a brushed permanent magnet DC motor or a brushless AC motor.

Referring to FIG. 4A, the sensor 406 is configured for determining a linear movement of the spool 404 based on a selection of a given pressurized fluid associated with a given port of the plurality of ports 410a and 410b of the sleeve 402. In one example, the sensor 406 may comprise a linear encoder that is configured to provide accurate measurement within 1 or 2 microns of a position of the spool 404 within the sleeve 402.

Figure 4B:
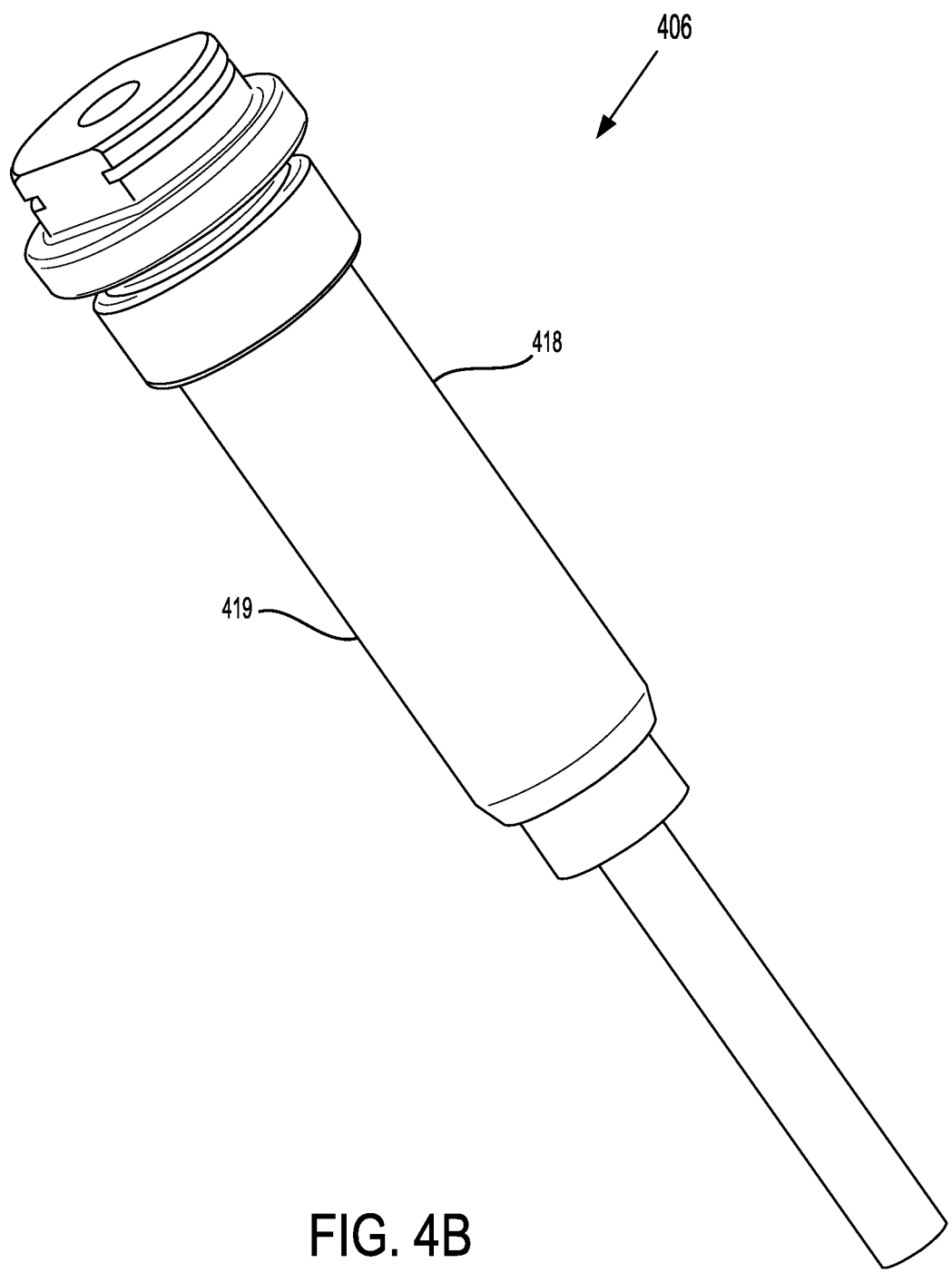
FIG. 4B illustrates a side view of an example sensor.

FIG. 4B illustrates a side view of the example sensor 406. In one example, the sensor 406 may comprise a linear variable differential transformer 418. By way of example, dimensions associated with a tubular part 419 and a plunger (not shown) may be altered as necessary so that the overall length of the linear variable differential transformer 418 is reduced based on a desired stroke length associated with the movement of the spool 404. For example, the tubular part 419 may be anchored to the sleeve 402 and the plunger attached to the spool 404. In another example, the linear variable differential transformer 418 may be coupled to the motor 408.

Figure 5A:
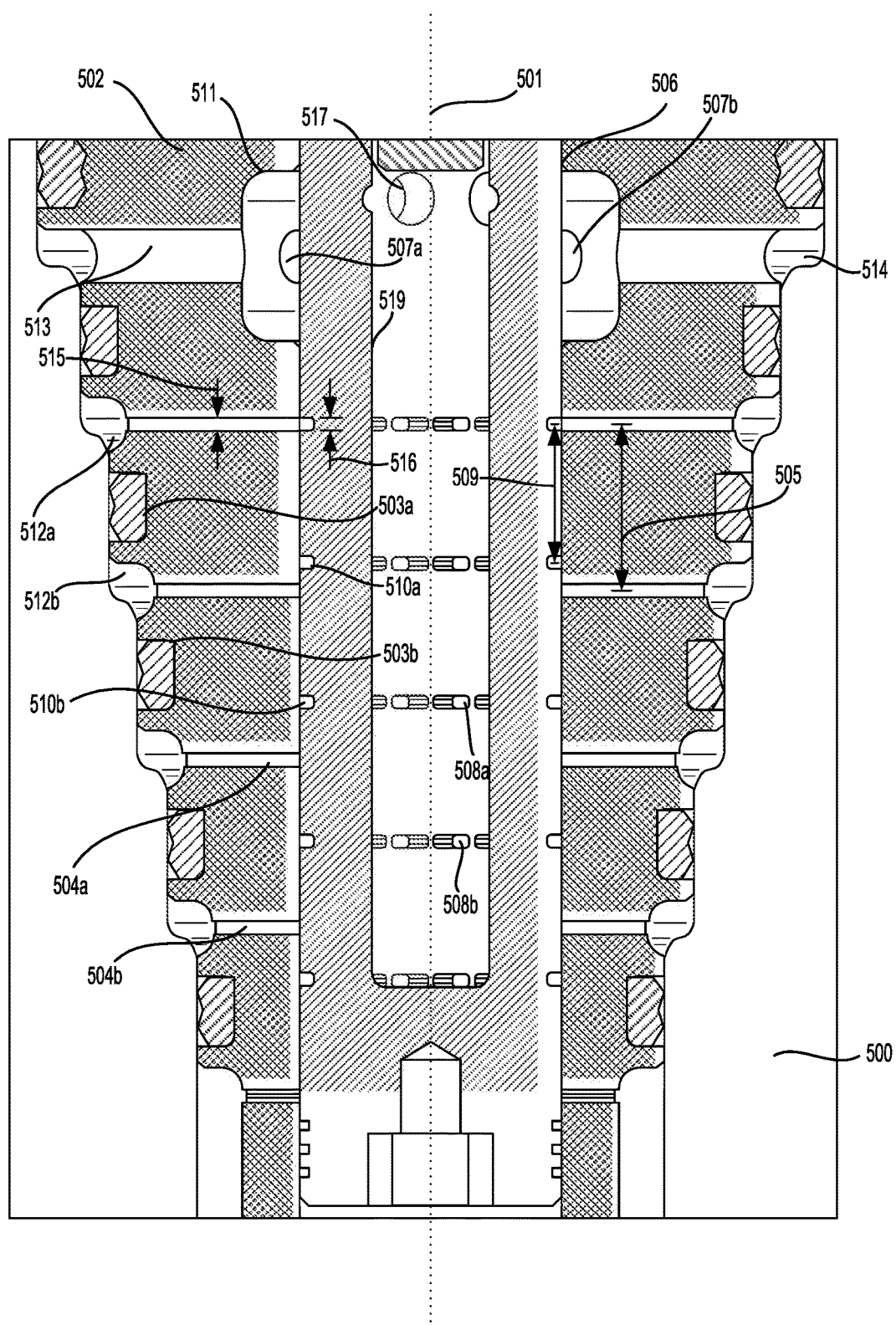
FIG. 5A illustrates a cross-sectional view of subcomponents of an example linear valve inserted into a manifold block.

FIG. 5A illustrates a cross-sectional view of subcomponents of another example linear valve inserted into a manifold block. A sleeve 502 comprising a plurality of ports 504a and 504b is provided within a manifold 500 is shown in FIG. 5A. A spool 506 comprising a plurality of openings 508a and 508b is provided within the sleeve 502.

Referring to FIG. 5A, the plurality of ports 504a and 504b are positioned along a longitudinal axis 501 of the sleeve 502. The plurality of ports 504a and 504b are spaced apart from each other at a first distance 505. By way of example, the first distance 505 may be about 5.75 mm. In one example, the plurality of ports 504a and 504b have widths 515 of substantially equal lengths as shown in FIG. 5A.

The spool 506 comprises a plurality of openings 508a and 508b along an external surface of the spool 506. The plurality of openings 508a and 508b comprise a plurality of grooves 510a and 510b configured as through-holes. The plurality of grooves 510a and 510b are spaced apart from each other at a second distance 509. By way of example, the second distance 509 may be about 4.75 mm. In this example, the second distance 509 is less than the first distance 505 in order to enable alignment between a given groove of the plurality of grooves 510a and 510b and a given port of the plurality of ports 504a and 504b based on a given position of the spool 506 within the sleeve 502. In one example, the plurality of grooves 510a and 510b have widths 516 of substantially the same lengths as the widths 515 of the plurality of ports 504a and 504b as shown in FIG. 5A. Other examples are possible as well, and dimensions provided herein are for illustration only.

In one example, the second distance 509 is a fraction of the first distance 505. The second distance 509 may be determined based on a fraction of the first distance 505 that enables a given port of the plurality of ports 504a and 504b to align with a given groove of the plurality of grooves 510a and 510b one at a time. In another example, a linear movement based on a predetermined distance, wherein the predetermined distance corresponds to a difference between the first distance 505 and the second distance 509, enables a transition in alignment between the plurality of ports 504a and 504b and the plurality of grooves 510a and 510b. By way of example, a selection of the plurality of pressurized fluids associated with the plurality of ports 504a and 504b may be made in a fast manner due to the predetermined distance required to transition alignment between the plurality of ports 504a and 504b and the plurality of grooves 510a and 510b.

As shown in FIG. 5A, the sleeve 502 comprises a plurality of seals 503a and 503b. The plurality of seals 503a and 503b and seal sleeve 502 create a plurality of annular channels 512a and 512b associated with a plurality of pressurized fluids. By way of example, the plurality of seals 503a and 503b may comprise a plurality of double-V type hydraulic seals. The plurality of double-V type hydraulic seals would work in a similar manner to an O-ring seal.

Referring to FIG. 5A, annular channel 514 connects to control port 513. The control port 513 comprises control port holes 507a and 507b and undercut groove 511. The undercut groove 511 communicates with control opening 517 which provides access to internal chamber 519 of the spool 506.

Figure 5B:
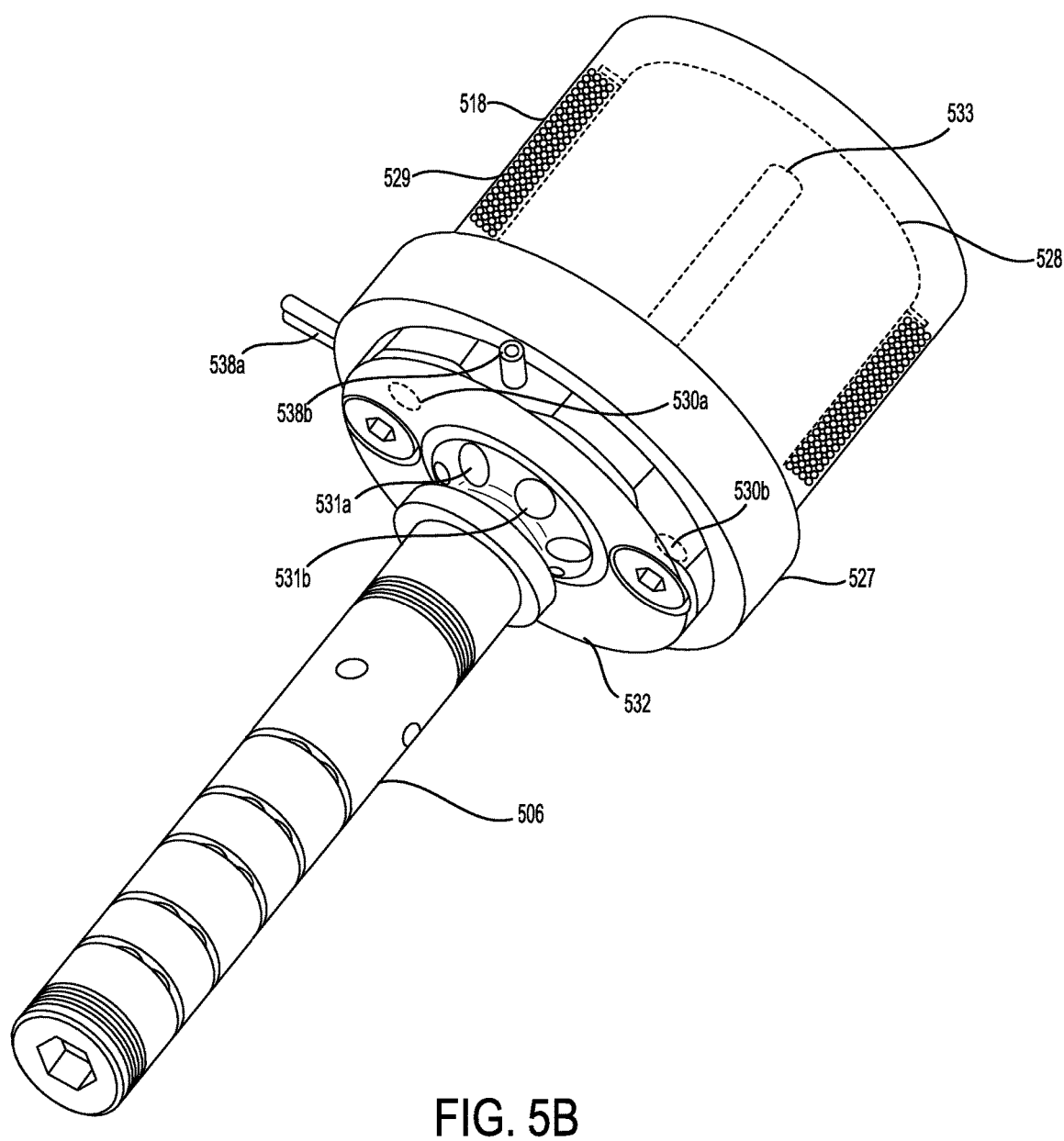
FIG. 5B illustrates a perspective view of the moving part of another example linear valve.

FIG. 5B illustrates a perspective view of the moving part of an example linear valve. The spool 506 is coupled to a coupler 532. The coupler 532 is shown coupled to a voice coil assembly 528 which includes a bobbin 527 and a coil 529. The spool 506 is also coupled to the plunger 533 by means of the coupler 532.

The coupler 532 may be configured to have a length of about 26 mm. In one example, the coupler 532 may be configured to receive a plurality of pins 538a and 538b coupled to an external surface of the coupler 532. The coupler 532 may comprise vent holes 531a and 531b that minimize fluid forces due to displacement of fluid as the voice coil assembly 528 extends or retracts. In one example, the coupler 532 may be fabricated out of an aluminum alloy. Any number of other materials may be used to fabricate the coupler 532.

Referring to FIG. 5B, the voice coil assembly 528 comprises the bobbin 527 and the coil 529. In one example, the voice coil assembly 528 may comprise a plurality of holes 530a and 530b for coupling to the coupler 532 through the use of a plurality of fasteners. By way of example, the plurality of pins 538a and 538b may be anti-rotation pins in order to prevent wires on the voice coil assembly from twisting.

Figure 5C:
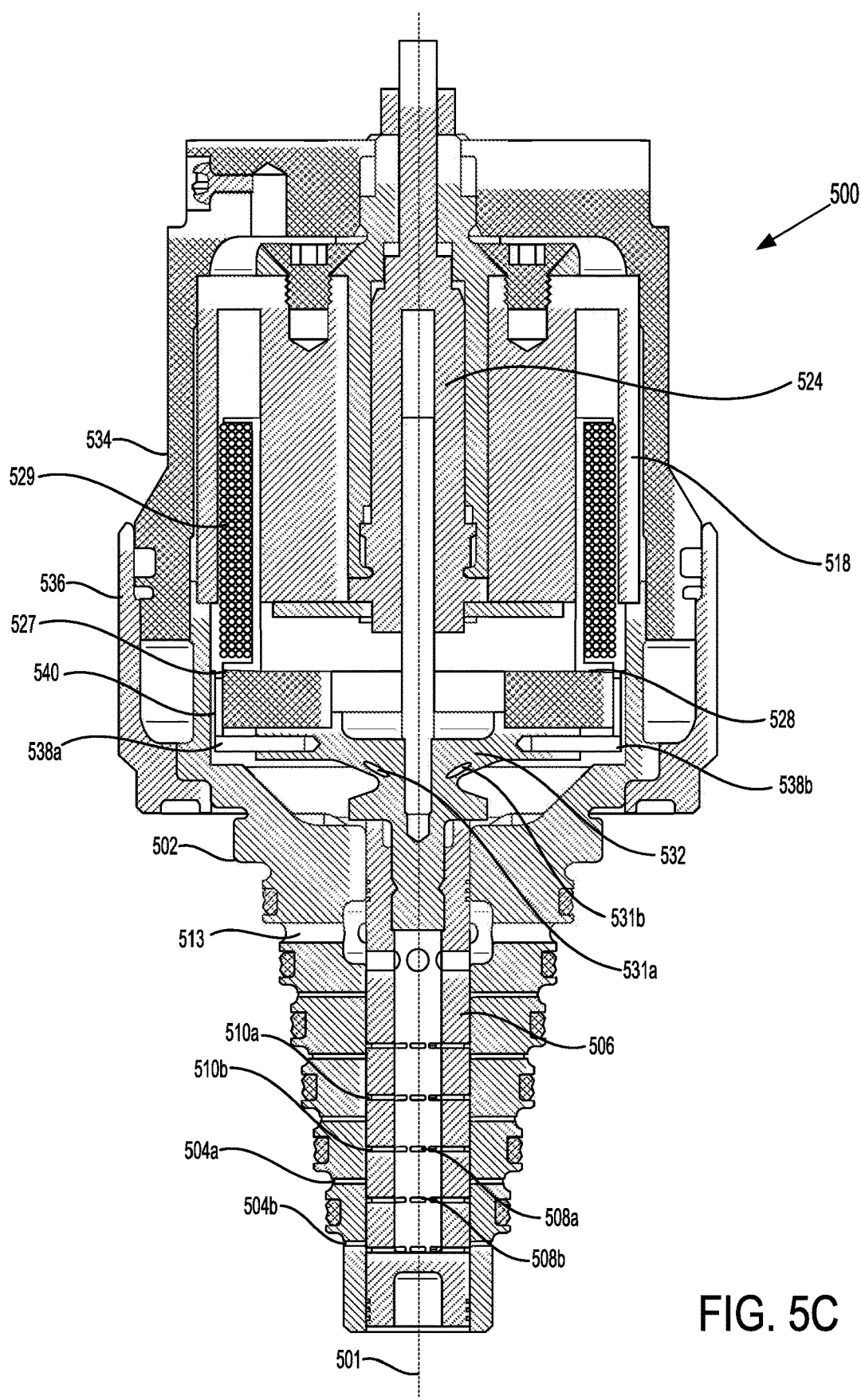
FIG. 5C illustrates a cross-sectional view of an example linear valve.

FIG. 5C illustrates a cross-sectional view of an example linear valve 500. Referring to FIG. 5C, the spool 506 is provided within the sleeve 502. The spool 506 is coupled to the coupler 532. The coupler 532 is also coupled to the voice coil assembly 528. The voice coil actuator stator 518 is configured to receive the voice coil assembly 528 as well as the linear variable differential transformer 524. A top cap 534 is coupled to the sleeve 502. A bottom cap 536 is coupled to the top cap 534.

Referring to FIG. 5C, the spool 506 is shown at a given position within the sleeve 502. Based on the given position of the spool 506, the spool 506 is shown to be in a null position. While the spool 506 is in the null position, none of the ports of the plurality of ports 504a and 504b are aligned with the grooves of the plurality of grooves 510a and 510b and control port 513 is closed off from the plurality of pressurized fluids.

The coupler 532 may comprise a plurality of pins 538a and 538b coupled to an external surface of the coupler 532. A given pin of the plurality of pins 538a and 538b may comprise steel and have a length of about 8 mm. By way of example, the plurality of pins 538a and 538b may engage slots to limit rotation of the voice coil assembly and thus prevent the terminal wires of the voice coil from getting tangled. As shown in FIG. 5C, the coupler 532 may comprise vent holes 531a and 531b allowing the voice coil actuator to operate when flooded with a fluid. In one example, the coupler 532 may be connected to the spool 506.

The sleeve 502 may comprise a plurality of slots 540. By way of example, the plurality of slots 540 may be machined into the sleeve and configured for receiving the plurality of pins 538a and 538b. Referring to FIG. 5C, the spool 506 may be insensitive to rotary position due to the plurality of grooves 508 being circumferential.

In one example, it may be important to prevent unintentional rotation of the spool 506 within the sleeve 502. In this example, to prevent radial imbalance between the spool 506 and the sleeve 502 the use of circumferential grooves may be used. In another example, the plurality of pins 538a and 538b may be provided within the plurality of slots 540 and may serve to reduce an unintentional rotation of the spool 506 within the sleeve 502. By way of example, the plurality of pins 538a and 538b may be anti-rotation pins that help to avoid twisting of voice-coil leads.

The linear variable differential transformer 524 is provided within the voice coil actuator stator 518. In one example, the linear variable differential transformer 524 is configured for measuring a linear movement of the spool 506 based on a selection of the given pressurized fluid associated with the given port of the plurality of ports 504a and 504b. The linear movement enables alignment between the given port of the plurality of ports 504a and 504b and a given opening of the plurality of openings 508a and 508b. In one example, the linear variable differential transformer 524 may be connected to the voice coil actuator stator 518.

The voice coil actuator stator 518 may be coupled to the sleeve 502 and configured for moving the spool 506 along the longitudinal axis 501 of the sleeve 502. The voice coil actuator stator 518 may be configured for moving the spool 506 based on the linear movement measured by the linear variable differential transformer 524.

In one example, the top cap 534 may comprise aluminum and have a diameter of about 49 mm. The top cap 534 may be coupled to the sleeve 502 and configured to provide a housing to various subcomponents of the linear valve 500 so that a given contaminant does not reach the various subcomponents.

The bottom cap 536 may be configured for attaching to the top cap 534 and also configured for preventing the given contaminant from reaching the various subcomponents. In one example, the bottom cap 536 may comprise aluminum and have a diameter of about 49 mm.

Figure 6:
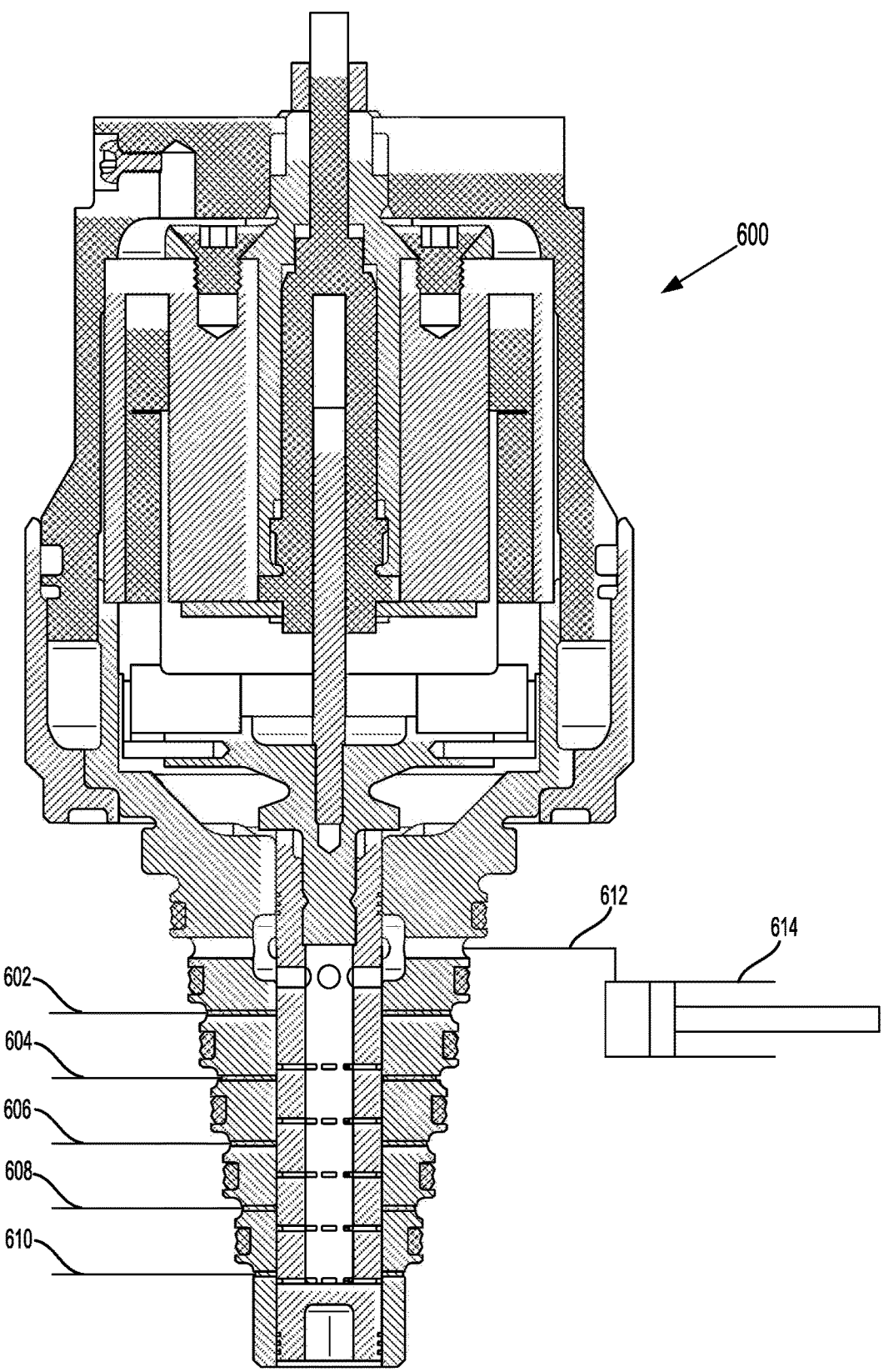
FIG. 6 illustrates a cross-sectional view of another example linear valve.

FIG. 6 illustrates a cross-sectional view of another example linear valve 600. The linear valve 600 is coupled to a plurality of pressure rails 602, 604, 606, 608, and 610. The linear valve 600 is also coupled to a hydraulic cylinder 614.

As shown in FIG. 6, the linear valve 600 is coupled to the plurality of pressure rails 602, 604, 606, 608, and 610. The plurality of pressure rails 602, 604, 606, 608, and 610 may be configured to provide a plurality of pressurized fluids at various pressure levels. In one example, the pressure levels associated with the plurality of pressure rails 602, 604, 606, 608, and 610 may comprise pressurized fluids at 3000 psi, 2250 psi, 1500 psi, 750 psi, and 100 psi. In another example, a given pressurized fluid of the plurality of pressurized fluids may be selected depending on a need to provide a given amount force to the hydraulic cylinder 614.

Referring to FIG. 6, the linear valve 600 may be coupled to the hydraulic cylinder 614 through a fluid line 612. Based on a selection of a given pressurized fluid of the plurality of pressurized fluids, the linear valve 600 may enable the given pressurized fluid to flow through the linear valve 600 to the hydraulic cylinder 614 in order to cause a given force based on a given pressure level associated with the given pressurized fluid to allow extension or retraction of the hydraulic cylinder 614.

By way of example, a signal corresponding to a selection of the given pressurized fluid may be received within a controller. The controller may be configured to determine the linear movement necessary to enable selection of the given pressurized fluid based on information indicating a position of a spool within a sleeve that may be received from an exemplary encoder. In this example, the controller may be configured to provide a signal corresponding to the required linear movement to a motor in order to position the spool within the sleeve and enable selection of the given pressurized fluid.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A linear valve comprising:
    a sleeve defining:
        a plurality of fluid ports arranged about the sleeve, each fluid port associated with a respective fluid pressure; and
        a control port in fluid communication with the plurality of fluid ports;
    a spool movably disposed within the sleeve for movement between a plurality of positions within the sleeve, the spool defining:
        a plurality of openings corresponding with the plurality of fluid ports of the sleeve and arranged about the spool to enable selective alignment of a given opening of the plurality of openings with a given fluid port of the plurality of fluid ports at a given position of the plurality of positions; and
        a control opening in fluid communication with the plurality of openings; and
    an actuator configured to move the spool along a linear movement to the given position of the plurality of positions within the sleeve based on a selection of the respective fluid pressure associated with the given fluid port of the plurality of fluid ports of the sleeve, wherein the selective alignment of the given opening with the given fluid port at the given position allows flow of a pressurized fluid at the respective fluid pressure associated with the given fluid port through the control opening to the control port.

2. The linear valve of claim 1, wherein the actuator is configured to move the spool to the given position so that the given opening of the plurality of openings partially overlaps the given fluid port of the plurality of fluid ports for metering of the pressurized fluid.

3. The linear valve of claim 1, wherein the actuator is configured to move the spool to the given position so that the given opening of the plurality of openings overlaps the given fluid port of the plurality of fluid ports in order to enable substantially full alignment between the given opening and the given fluid port.

4. The linear valve of claim 1, wherein the plurality of openings are configured as through-holes in the spool and are pressure-balanced.

5. The linear valve of claim 1, wherein the plurality of fluid ports have axial widths of substantially equal lengths.

6. The linear valve of claim 5, wherein the plurality of openings have widths of substantially the same lengths as the axial widths of the plurality of fluid ports.

7. The linear valve of claim 1, wherein the plurality of fluid ports have axial widths of unequal lengths.

8. The linear valve of claim 7, wherein the plurality of openings have widths of unequal lengths that correspond to the axial widths of the plurality of fluid ports.

9. The linear valve of claim 1, wherein the sleeve defines a first longitudinal axis and the plurality of ports are spaced apart from each other along the longitudinal axis of the sleeve at a first distance, and wherein the spool defines a second longitudinal axis and the plurality of openings are spaced apart from each other along the longitudinal axis of the spool based on a second distance, the second distance based on a fraction of the first distance.

10. A linear valve comprising:
    a sleeve defining:
        a plurality of fluid ports arranged about the sleeve, each fluid port associated with a fluid pressure; and
        a control port in fluid communication with the plurality of fluid ports;
    a spool movably disposed within the sleeve for movement between a plurality of positions, the spool defining:
        a plurality of openings corresponding with the plurality of fluid ports of the sleeve and arranged about the spool to enable selective alignment of a given opening of the plurality of openings with a given fluid port of the plurality of fluid ports at a given position of the plurality of positions; and
        a control opening in fluid communication with the plurality of openings;
    an actuator configured to move the spool in a linear movement between the plurality of positions within the sleeve, wherein the selective alignment of the given opening with the given fluid port at the given position allows flow of a pressurized fluid at the fluid pressure associated with the given fluid port through the control opening to the control port;
    a sensor for determining a position of the spool within the sleeve; and
    a controller for determining the linear movement of the spool based on the position of the spool within the sleeve and a selection of a given fluid pressure associated with the given fluid port of the plurality of fluid ports of the sleeve.

11. A method comprising:
    receiving, at a controller, an indication of a selected fluid pressure; and
    actuating, by the controller, an actuator to move a spool movably disposed within a sleeve along a linear movement to a given position of a plurality of positions based on the selected fluid pressure,
    wherein the sleeve defines:
        a plurality of fluid ports arranged about the sleeve, each fluid port associated with a respective fluid pressure; and
        a control port in fluid communication with the plurality of fluid ports, and
    wherein the spool defines:
        a plurality of openings corresponding with the plurality of fluid ports of the sleeve and arranged about the spool to enable selective alignment of a given opening of the plurality of openings with a given fluid port of the plurality of fluid ports at the given position of the plurality of positions; and
        a control opening in fluid communication with the plurality of openings, and
    wherein the selective alignment of the given opening with the given fluid port at the given position allows flow of a pressurized fluid at the respective fluid pressure associated with the given fluid port through the control opening to the control port.

12. The method of claim 11, wherein actuating the actuator to move the spool within the sleeve to the given position comprises moving the spool to the given position so that the given opening of the plurality of openings partially overlaps the given fluid port of the plurality of fluid ports for metering of the pressurized fluid.

13. The method of claim 11, wherein actuating the actuator to move the spool within the sleeve to the given position comprises moving the spool to the given position so that the given opening of the plurality of openings overlaps the given fluid port of the plurality of fluid ports in order to enable substantially full alignment between the given opening and the given fluid port.

14. The method of claim 11, wherein the plurality of openings are configured as through-holes in the spool and are pressure-balanced.

15. The method of claim 11, wherein the plurality of fluid ports have axial widths of substantially equal lengths.

16. The method of claim 15, wherein the plurality of openings have widths of substantially the same lengths as the axial widths of the plurality of fluid ports.

17. The method of claim 11, wherein the plurality of fluid ports have axial widths of unequal lengths.

18. The method of claim 17, wherein the plurality of openings have widths of unequal lengths that correspond to the axial widths of the plurality of fluid ports.

19. The method of claim 11, further comprising:
receiving, at the controller, a position signal from a position sensor configured to sense a position of the spool within the sleeve; and
determining, by the controller, the linear movement of the spool based on the position signal from the position sensor.

20. The method of claim 11, wherein the sleeve defines a first longitudinal axis and the plurality of ports are spaced apart from each other along the longitudinal axis of the sleeve at a first distance, and wherein the spool defines a second longitudinal axis and the plurality of openings are spaced apart from each other along the longitudinal axis of the spool based on a second distance, the second distance based on a fraction of the first distance.

* * * * *